United States Patent
Körösi et al.

(10) Patent No.: US 10,079,766 B2
(45) Date of Patent: Sep. 18, 2018

(54) METHODS AND PACKET NETWORK DEVICES FOR FORWARDING PACKET DATA TRAFFIC

(71) Applicant: Telefonaktiebolaget L M Ericsson (publ), Stockholm (SE)

(72) Inventors: Attila Körösi, Budapest (HU); Krisztian Nemeth, Budapest (HU)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 81 days.

(21) Appl. No.: 14/892,626

(22) PCT Filed: May 21, 2013

(86) PCT No.: PCT/EP2013/060404
§ 371 (c)(1),
(2) Date: Nov. 20, 2015

(87) PCT Pub. No.: WO2014/187475
PCT Pub. Date: Nov. 27, 2014

(65) Prior Publication Data
US 2016/0173382 A1   Jun. 16, 2016

(51) Int. Cl.
H04L 12/803    (2013.01)
H04L 12/721    (2013.01)
H04L 12/707    (2013.01)

(52) U.S. Cl.
CPC ............ H04L 47/125 (2013.01); H04L 45/12 (2013.01); H04L 45/124 (2013.01); H04L 45/24 (2013.01)

(58) Field of Classification Search
None
See application file for complete search history.

(56) References Cited

U.S. PATENT DOCUMENTS 8,014,278 B1    9/2011    Subramanian et al.
8,223,741 B1    7/2012    Bartlett et al.
(Continued)

FOREIGN PATENT DOCUMENTS

EP    1535432 B1 *  10/2007    ............ H04L 12/56
EP    1535432 B1     10/2007
(Continued)

OTHER PUBLICATIONS

Fortz, Bernard et al., "Increasing Internet Capacity Using Local Search", Computational Optimization and Applications, vol. 29, 2004, 13-48.
Fortz, Bernard et al., "Traffic Engineering With Traditional IP Routing Protocols", IEEE Communications Magazine, vol. 40, No. 10, Oct. 2002, 1-15.
Moy, J., "OSPF Version 2", Internet Engineering Task Force, Network Working Group, Request for Comments 2328, Apr. 1998, 1-197.
(Continued)

Primary Examiner — Charles C Jiang
Assistant Examiner — George Atkins, Jr.
(74) Attorney, Agent, or Firm — Murphy, Bilak & Homiller, PLLC (57) ABSTRACT

A method performed by a packet network device for enabling forwarding of packet data traffic among a plurality of physical links from the packet network device towards a destination packet network device, e.g. in an unequal split ratio. A number of virtual links are established 504 alongside at least one physical link of the plurality of physical links. The packet data traffic is routed 506 among the physical links and the established virtual links, utilizing a shortest path routing protocol with load balancing. By establishing virtual links alongside physical links packet the data packet traffic may be routed on the total number of links, thereby achieving a more effective use of available communication resources.

3 Claims, 7 Drawing Sheets

(56) References Cited

U.S. PATENT DOCUMENTS

| | | | |
|---|---|---|---|
| 2003/0137978 A1 | 7/2003 | Kanetake et al. | |
| 2005/0160171 A1* | 7/2005 | Rabie | H04L 12/5695 709/227 |
| 2008/0031263 A1 | 2/2008 | Ervin et al. | |
| 2010/0214913 A1* | 8/2010 | Kompella | H04L 45/125 370/230 |
| 2010/0272110 A1* | 10/2010 | Allan | H04L 45/02 370/395.53 |
| 2014/0201383 A1* | 7/2014 | Kuehnel | H04W 76/025 709/231 |

FOREIGN PATENT DOCUMENTS

| | | | |
|---|---|---|---|
| WO | 2005018175 A2 | 2/2005 | |
| WO | 2010124367 A1 | 11/2010 | |

OTHER PUBLICATIONS

Oran, David, "OSI ISIS Intradomain Routing Protocol", Internet Engineering Task Force, Network Working Group, Request for Comments 1142, Feb. 1990, 1-157.

Retvari, Gabor et al., "On Shortest Path Representation", IEEE/ACM Transactions on Networking, vol. 15, No. 6, Dec. 2007, 1293-1306.

Wang, Yufei et al., "Internet Traffic Engineering without Full Mesh Overlaying", Proceedings of INFOCOM 2001, vol. 1, Apr. 2001, 565-571.

Xu, Dahai et al., "Link-State Routing With Hop-by-Hop Forwarding Can Achieve Optimal Traffic Engineering", IEEE/ACM Transactions on Networking, vol. 19, No. 6, 2011, 1717-1730.

* cited by examiner

METHODS AND PACKET NETWORK DEVICES FOR FORWARDING PACKET DATA TRAFFIC

TECHNICAL FIELD

The present disclosure relates generally to a method and an arrangement for traffic engineering, especially for enabling forwarding of packet data traffic among a plurality of physical links when load balancing is applied.

BACKGROUND

In PS (Packet Switched) communication networks, data is generally communicated between packet network devices, e.g. routers, gateways, etc., in form of data packets according to suitable communication protocols, e.g. IP (Internet Protocol). Between the packet network devices communication links are established, on which the data packets are transmitted.

Traffic engineering is generally known as a process for setting up suitable paths between packet network devices for a given set of transmission demands, along with respective desired traffic volumes. Typically, such a path comprises a plurality of communication links and a number of intermediate packet network devices on the way from a first packet network device to a destination packet network device.

In traffic engineering various processes are applied for controlling establishment of paths between packet network devices via one or more communication links and intermediate packet network devices. One example is to use a connection oriented infrastructure for this purpose, such as MPLS RSVP-TE (Multiprotocol Label Switching, Resource Reservation Protocol-Traffic Engineering). This scheme requires adding new infrastructure to the network, which is not attractive for some of the network operators.

Therefore, many service providers deploy traffic engineering right on top of the traditional routing protocols that already are available in the packet network devices, e.g. OSPF (Open Shortest Path First), defined in "RFC (Request For Comments) 2328", IETF (Internet Engineering Task Force), or IS-IS (Intermediate System to Intermediate System intra-domain routing information routing information exchange protocol) defined in "ISO/IEC (International Standard Organisation/International Electrotechnical Commission) 10589:2002", by carefully setting the link costs, such that the paths to be established would be selected by the routing protocol as shortest path.

Throughout this description the term "cost" will be used to represent an administrative value assigned to a link. However, it is to be noted that alternative terms are used within literature to define this value, for instance "weight" or even "length". The length or cost of a path is the sum of the lengths or costs of the links which constitute the path. It is also to be noted that the link costs in general are not related to the physical lengths of the links, but is merely an administrative parameter to be used to control the routing of paths between packet network devices.

The term "traffic demand" will be used to denote that an amount of packet data would be forwarded from a first packet network device to another packet network device. For instance, one traffic demand may be that a first router in a PS communication network wants to forward an amount of packet data to a second router, and another traffic demand may be that a third router wants to forward another amount of packet data to a fourth router. In general, the packet data networks comprise a plurality of routers or other packet network devices and are connected by communication links or communication paths, and intermediate routers in a network structure. In the packet network devices of a PS communication network, there will typically be more than one traffic demand to take care about when routing/transporting packet data.

The term "load balancing" will be used to denote processes for controlling routing of packet data in PS communication networks, in order to balance the loads of the packet data between communication links or communication paths in the PS communication networks. In general, when routing in accordance with OSPF, load balancing is performed in accordance with ECMP (Equal Cost MultiPath)

When transporting packet data in PS communication networks, routing and transporting of packet data are performed in the IP-layer. The IP-layer comprises a plurality of planes, i.e.; the management plane, where communication links and communication paths are set up or established; the control plane, where packet data is routed on the communication links or communication paths; and the data plane, where the forwarding or transport of the packet data is performed.

Figure 1:
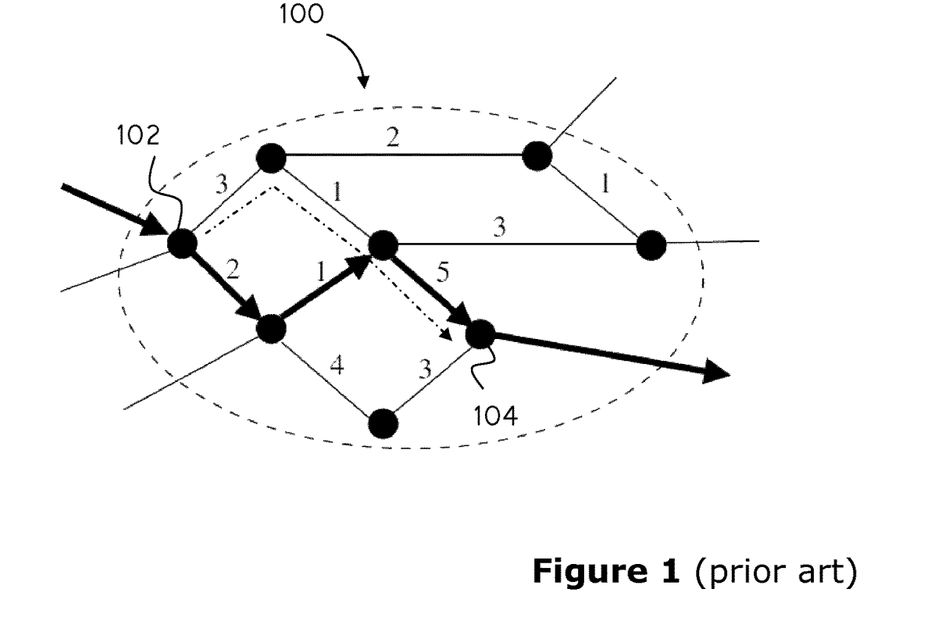
FIG. 1 is an overview illustrating a routing scenario, according to the prior art.

With reference to FIG. 1, which is a schematic overview, a shortest path routing scenario for a PS communication network with a plurality of communication links will now be described according to an example.

In a PS communication network 100 a plurality of packet network devices (illustrated as filled dots) are connectable to each other by communication links (lines between the filled dots) which each have respective link costs associated. Between a first packet network device 102 and a second packet network device 104, a plurality of possible paths are available for routing, e.g.: a first path (illustrated with bold arrows) which has a total cost of 2+1+5=8, and a second path (dash dotted arrow) which has a total cost of 3+1+5=9. All the communication network devices in this example route packets in accordance with OSPF, and the first packet network device selects the first path because of its lower cost.

Figure 2:
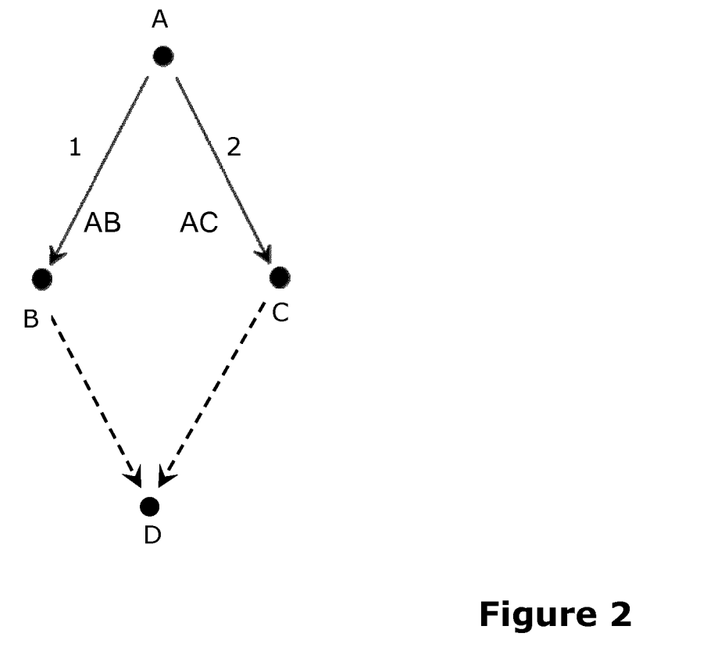
FIG. 2 is a graph illustrating a load balancing scenario, according to the prior art.

With reference to FIG. 2, which is a schematic network graph, a load balancing scenario for a packet network device A will now be described according to an example.

In a PS communication network, a traffic demand is to forward 3 Gb/s (Gigabit per second) from the packet network device A to the packet network device D. The routing is performed in accordance with the OSPF protocol. In this scenario, the first packet network device A has two possible paths to route, the first communication path which is associated with a desired traffic volume of 1 Gb/s, and the second communication path which is associated with a desired traffic volume of 2 Gb/s.

As stated above, when routing according to OSPF, load balancing is commonly performed according to ECMP. When performing load balancing in accordance with ECMP, the packet data flow will be split equally over the routed communication links, when routing. Here, 1.5 Gb/s will be routed on each of the first communication link AB and the second communication link AC.

In this case 1.5 MB/s will be routed on the first communication link, instead of 1 Mb/s. This overload may cause excessive packet losses, delays, and/or other communication problems when forwarding the packet data. In addition, the higher desired traffic volume of the second communication link will not be fulfilled.

There is a need to effectively control the utilisation of available communication resources for packet data traffic in PS communication networks.

SUMMARY

It would be desirable to obtain improved performance in PS (Packet Switched communication networks. It is an object of this disclosure to address at least some of the issues outlined above.

Further, it is an object to provide a mechanism for enabling forwarding of packet data traffic among a plurality of physical links in a PS data network in an unequal split ratio, from a packet network device towards a destination packet network device. These objects may be met by a method and a packet network device according to the attached independent claims.

According to one aspect, a method is provided for enabling forwarding of packet data traffic among a plurality of physical links, from a packet network device towards a destination packet network device. A number of virtual links is established alongside at least one physical link of the plurality of physical links. The packet data traffic is routed among the physical links and the established virtual links, utilising a shortest path routing protocol with load balancing.

Thereby, a total traffic volume of packet data traffic (or a demand of total volume of packet data traffic) can be routed on the physical links and the established virtual links. This routing of packet data traffic (or demand of the same) can utilize a shortest path routing protocol with load balancing such that the data traffic (or demand of the same) is evenly split between all links, i.e. physical links as well as virtual links. Subsequently, the packet data traffic can be forwarded to the destination packet network device on the physical links according to the preceding routing. Accordingly, for each physical link, packet data traffic routed on the physical link and packet data traffic routed on the associated established virtual links of the physical link, will be forwarded on the physical link in accordance with the preceding routing of packet data traffic of each physical link and its associated virtual link(s).

According to another aspect, a packet network device is provided for enabling forwarding of packet data traffic among a plurality of physical links from the packet network device towards a destination packet network device. The packet network device comprises a communication unit, a processor and a memory which stores computer program code, which, when run in the processor, causes the packet network device to establish a number of virtual links alongside at least one physical link of the plurality of physical links. Furthermore, the computer program code causes the packet network device to route the packet data traffic among the physical links and the established virtual links, utilising a shortest path routing protocol with load balancing. The communication unit is configured to forward the data traffic on the physical links.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided which will achieve an effective utilisation of available communication resources in PS (Packet Switched) communication networks. When establishing the virtual links, one or more virtual links are established alongside the physical links.

Load balancing in PS communication networks has been described within prior art. For instance, the patent publication U.S. Pat. No. 8,014,278, B1 describes a way to to achieve an equal load share amongst the outgoing paths, WO/2010/124367 describes virtual links (in Ethernet) that are not parallel to existing ones, and EP 1 535 432, B1 also targets load sharing in non-equal proportion, however it takes a different approach, using not only the shortest path routes. Therefore, unlike our solution, it requires the modification of existing routing protocols and routers. However, none of the publications describe the present claimed solution Within this description, the definition that a virtual link is established "alongside" a physical link means that the virtual link has the same startpoint and endpoint as the physical link, e.g. the virtual link may be established in parallel with the physical link.

Figure 3:
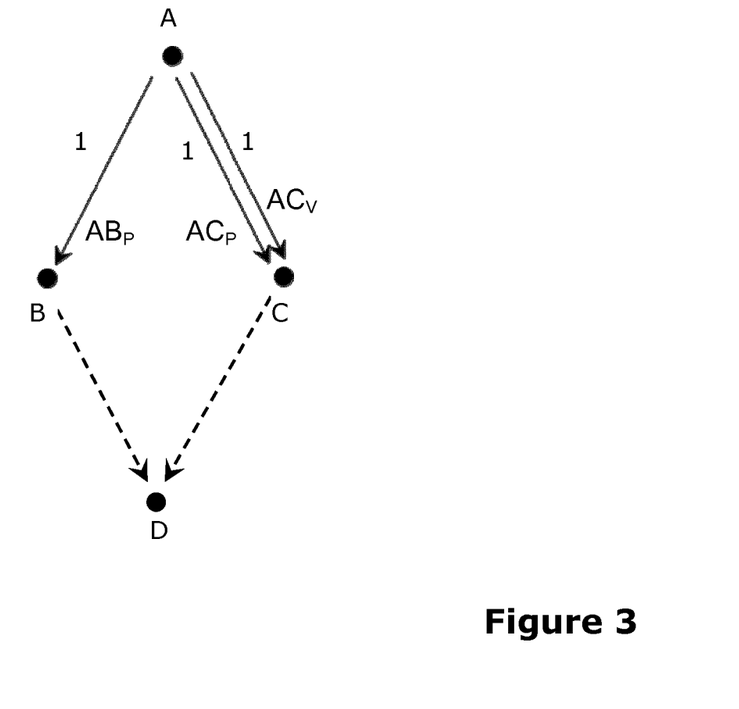
FIG. 3 is a graph illustrating a load balancing scenario, according to possible embodiments.

With reference to FIG. 3, which is a schematic network graph, a load balancing scenario for a first packet network device A will now be described in accordance with an exemplifying embodiment.

This exemplifying embodiment is based on the example scenario described with reference to FIG. 2. As said above in the example with reference to FIG. 2, there are two possible communication paths to route from the first packet network device A, to the destination packet network device D, a first communication path which comprises a physical link $AB_P$ between the packet network devices A and B, and a second communication path which comprises a physical link $AC_P$ between the packet network devices A and C. The desired traffic volume of the first physical link $AB_P$ is 1 Gb/s the desired traffic volume of the second physical link $AC_P$ is 2 Gb/s. A virtual link $AC_V$ is established alongside the second physical link $AC_P$. When load balancing in accordance with ECMP, the first packet network device A routes the outgoing traffic volume equally on the three communication links, i.e. ⅓ of the outgoing traffic volume over each communication link $AB_P$, $AC_P$, $AC_V$. The actual forwarding of packet data will however then be performed on the physical links $AB_P$ and $AC_P$, with 1 Gb/s on $AB_P$ and 2 Gb/s on $AC_P$.

To establish virtual links alongside physical links achieves an efficient setup of how packet data later will be transported on the physical links.

The virtual links can be provisioned using several techniques, such as Ethernet VLANs (Virtual Local Area Network), IP-IP tunnels (Internet Protocol), GRE tunnels (Generic Routing Encapsulation), stacked MPLS (MultiProtocol Label Switching) LSPs (Label-Switched Path), etc.

As mentioned above, thereby, the packet network device will be capable to transport ⅓ of the total desired traffic volume on the first physical link $AB_P$ and ⅔ of the total desired traffic volume on the second physical link $AC_P$.

By establishing virtual links alongside some of the physical links and routing data traffic on both the virtual links and the physical links, the packet network device will be able to make use of sharing the traffic volume in arbitrary proportion between the physical links when later forwarding the packet data. Thereby a more efficient use of the PS communication network will be achieved.

Figure 5:
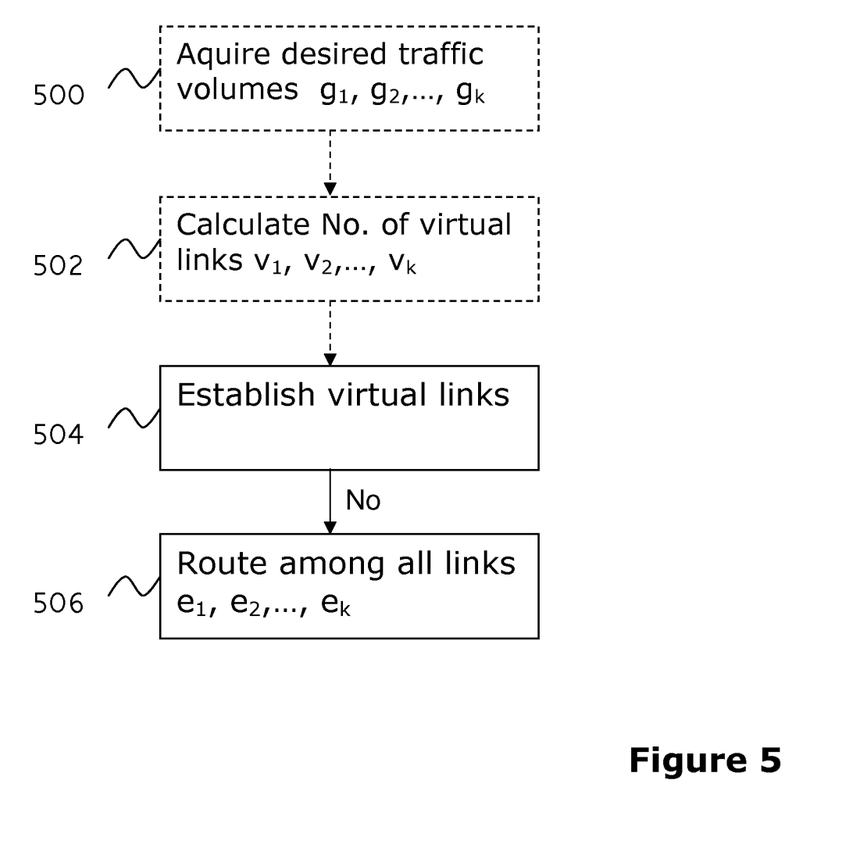
FIG. 5 is a flow chart illustrating a method for load balancing, according to possible embodiments.

With reference to FIG. 5, which is a schematic flow diagram, a method for performing load balancing in a first packet network device in a PS communication network will now be described in accordance with an exemplifying embodiment.

The first packet network device is comprised in a PS communication network, in which also a plurality of further packet network devices is comprised. Between the first packet network device and the further packet network devices, a plurality of physical links $l_1, l_2, \ldots, l_k$ are set up in order to distribute a total traffic volume G. Each of the physical links $l_1, l_2, \ldots, l_k$ has a desired traffic volume $g_1, g_2, \ldots, g_k$ set, and the total traffic volume G is the sum of the desired traffic volume $g_1, g_2, \ldots, g_k$, i.e. $G = g_1 + g_{2+}, \ldots, + g_k$.

In a first action 500, which is optional, the first packet network device acquires information regarding the desired traffic volumes $g_1, g_2, \ldots, g_k$. In this exemplifying embodiment, information regarding the desired traffic volumes has been stored in the first packet network node prior to the load balancing.

In a subsequent action 502, which is optional, a number of virtual links $v_1, v_2, \ldots, v_k$ is calculated for each respective of the physical links $l_1, l_2, \ldots, l_k$. The numbers of virtual links is calculated such that the total number of links $e_1, e_2, \ldots, e_k$, for each physical link, i.e. $1+v_1, 1+v_2, \ldots, 1+v_n$, is proportional to the desired traffic volumes $g_1, g_2, \ldots, g_k$.

The calculated numbers of virtual links $v_1, v_2, \ldots, v_k$ is then established alongside the corresponding physical links $l_1, l_2, \ldots, l_k$, in a following action 504.

In a final action 506, the desired traffic volumes $g_1, g_2, \ldots, g_k$ are distributed among the total number of links $e_1, e_2, \ldots, e_k$, in accordance with ECMP load balancing.

By applying the described method and establishing a number of virtual links alongside the physical links, when performing load balancing in accordance with ECMP, the packet network device will, for each physical link $l_1, l_2, \ldots, l_k$ determine a total number of links $e_1, e_2, \ldots, e_k$, to distribute the total traffic volume on. Typically, for each physical link $l_1, l_2, \ldots, l_k$, a number of virtual links $v_1, v_2, \ldots, v_k$ is established, such that the total number of links $e_1 = 1+v_1, e_2 = 1+v_2, \ldots, e_k = 1+v_k$.

When performing the actual forwarding of packet data, the packet data which have been routed on a physical link $p_i$ and its established virtual link(s) $v_i$ will be forwarded on the physical link $p_i$. Thereby, an arbitrary traffic sharing ratio is achieved between the physical links, and not just an equal split, which results in a more effective use of the communication links.

In an alternative exemplifying embodiment, which is based on the one described above, the action 504 may be performed differently. For instance the desired traffic volumes $g_1, g_2, \ldots, g_k$ may be pre-set in the packet network node, and the virtual links will be established according to the desired traffic volumes. Therefore, in this generic exemplifying embodiment, the actions 500 and 502 may be omitted. Alternatively, the information regarding the desired traffic volumes may instead be obtained from an external control unit or any other suitable unit.

In another exemplifying embodiment, which is based on some embodiments described above, the total number of links (physical+virtual) is allowed to be 0. This means that a physical link which, for any reason, is not suitable to apply may be disabled administratively.

Commonly, however, the total number of links (physical+virtual) which a packet network device could use in an ECMP scenario is limited. In order to distribute the available virtual links appropriately, a process for determining an effective establishment of virtual links will therefore be described.

Figure 6:
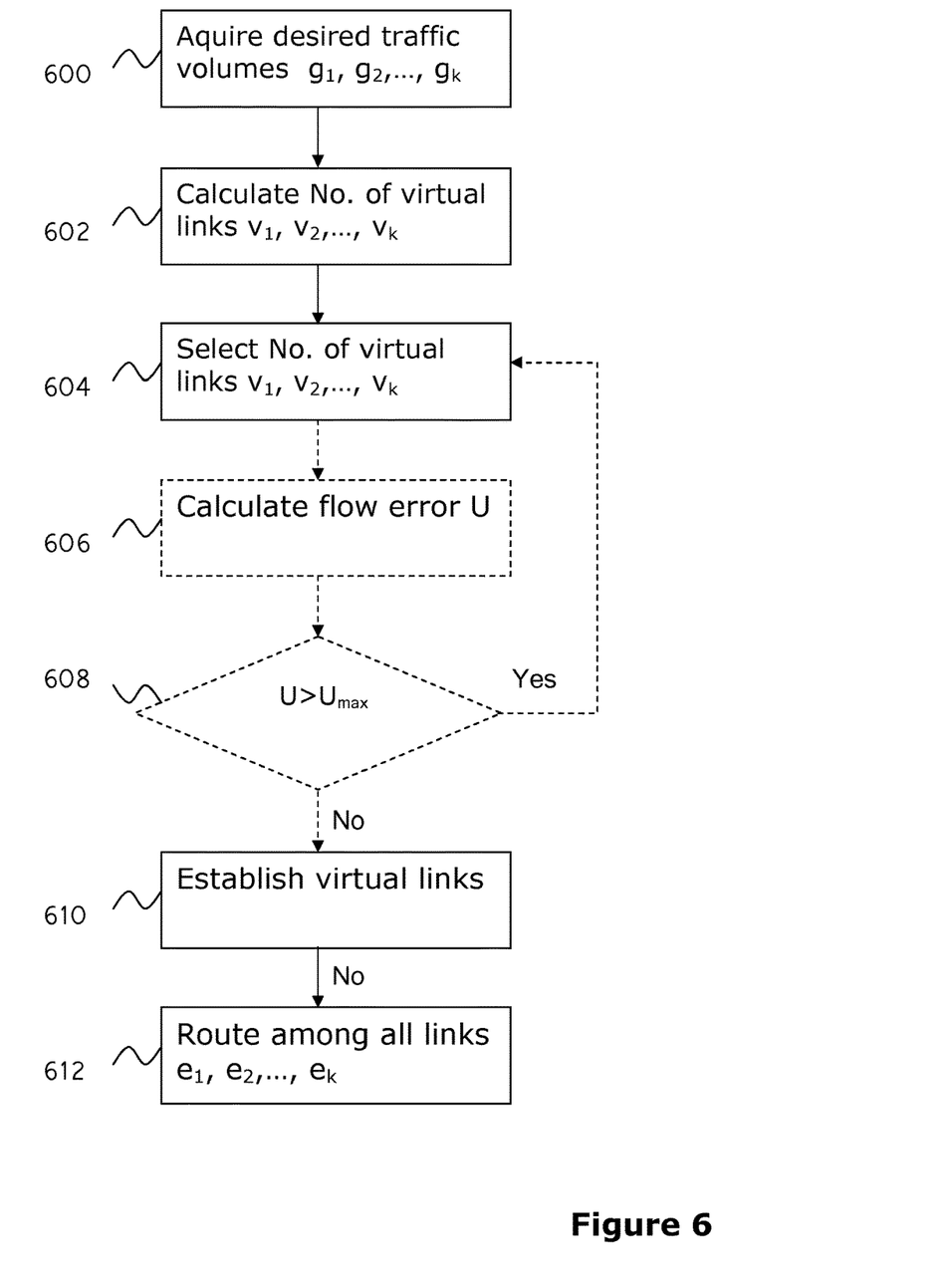
FIG. 6 is a flow chart illustrating a method for load balancing, according to possible embodiments.

With reference to FIG. 6, which is a schematic flow diagram, a method for performing load balancing in a first packet network device in a PS communication network will now be described in accordance with an exemplifying embodiment.

This exemplifying embodiment is based on some exemplifying embodiment described in accordance with FIG. 5. The actions 600, 602, 610, and 612 correspond to the actions 500, 502, 504, and 506, respectively and will therefore not be further discussed. However, this exemplifying embodiment differs from the one described with reference to FIG. 5 in that the number of available virtual links $v_1, v_2, \ldots, v_k$ is limited.

In an intermediate action 604, which is performed after the action 602 but before the action 610, the packet network device selects how the limited number of virtual links will be established in action 610. For instance, the selection may be based on statistics of distributed traffic volumes of the first packet network device.

Optionally, in another intermediate action 606, the packet network device may calculate a flow error U for the establishment of virtual links which was selected in action 604. The flow error U may be calculated as $$U = \max_{i=1 \ldots k} \left\{ \frac{\hat{g}_i}{g_i} - 1 \right\},$$

where k is the number of outgoing physical links from the packet network device, $g_i$ is a desired traffic volume of data to be forwarded on a physical link $l_i$, $\hat{g}_i$ is an actual traffic volume on the i:th physical link $l_i$. In other words, $g_i$ is the desired traffic volume which is routed on the i:th physical link $l_i$, and the virtual links $v_i$ which are established alongside the i:th physical link $l_i$.

The packet network device may further evaluate the selected establishment of action 604 by comparing the calculated flow error U with a suitable threshold, in an optional intermediate action 608. As long as the flow error U is larger than the threshold, the method may return to action 604, where a different establishment of the virtual links will be selected, before proceeding with calculating the flow error U for the new selection, etc.

If, on the other hand, the calculated flow error U is below the threshold, the method proceeds with the action 610 and establishes the selected virtual links.

The actual evaluation and selection of an appropriate establishment of the virtual links may be performed differently within the concept. For instance, all possible combinations established virtual links may be evaluated, dynamic programming may be applied, or binary search may be applied, etc.

Figure 7:
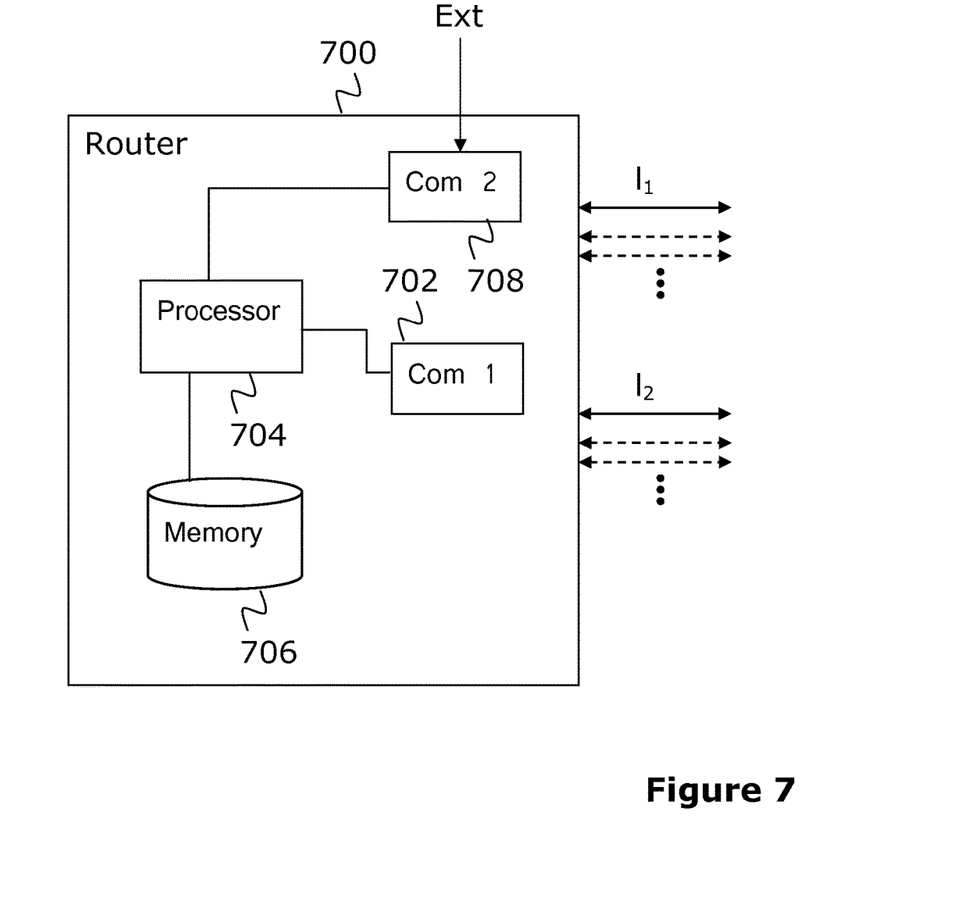
FIG. 7 is a schematic block diagram illustrating a packet network device, according to possible embodiments.

With reference to FIG. 7, which is a schematic block diagram, a packet network device in a PS communication network will now be described in accordance to an exemplifying embodiment.

The packet network device 700 may be embodied as a router. Furthermore, the packet network device may be configured to perform hereinabove described methods. The packet network 700 comprises a communication unit 702 configured for communication with other packet network devices via communication links $l_1$, $l_2$. The packet network device comprises also a processor 704 and a memory 706.

The memory 706 stores computer program code, which, when run in the processor 704 causes the packet network device 700 to establish a number of virtual links alongside at least one physical link, and route packet data on the physical links and the virtual links, using a shortest path routing protocol with load balancing. Furthermore, the communication unit 702 is configured to forward the routed data on the physical links.

The memory 706 may also store computer program code, which, when run in the processor 702 causes the packet network device 700 to acquire information about the desired traffic volumes of the physical links and based on the acquired information calculating the number of virtual links to be proportional to the desired traffic capacities of the physical links.

In another exemplifying embodiment, which is based on the one described above, the packet network device further comprises a second communication unit 708, which may be adapted to obtain the information regarding the desired traffic volumes of the physical links $l_1$, $l_2$. The memory 706 may further store the obtained information.

It is to be noted that even if the unit Gb/s has been used throughout the described exemplifying embodiments, the concept is not limited thereto. Any other suitable unit may be applied as data communication rate.

Furthermore, it is to be understood that a skilled person realises how to combine characterising features of the above described embodiments, when performing load balancing in PS communication networks.

Figure 4:
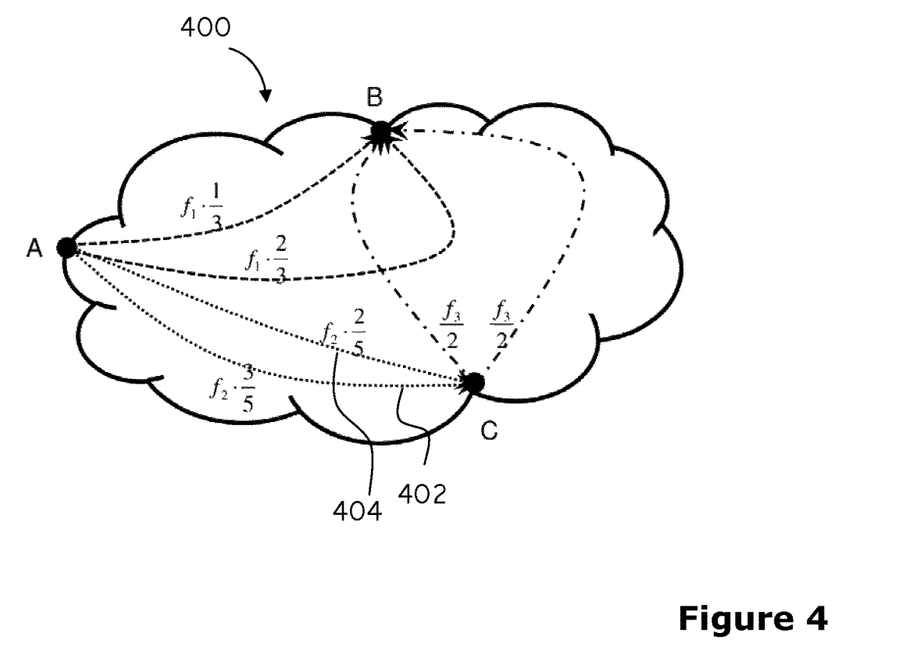
FIG. 4 is a graph illustrating a load balancing scenario, according to possible embodiments.

Although procedures and packet network devices for enabling load balancing for outgoing communication links from packet network devices in PS communication networks are described in the example embodiments above, the concept is not limited thereto. The described procedures and packet network devices can easily, as is realised by one skilled in the art, be adapted to be applied to any suitable load balancing situation in PS communication networks, e.g. to balance loads on a plurality of routed paths between two packet network devices. For instance, in a schematic scenario which is illustrated in FIG. 4, three packet network devices A, B, C are arranged in a PS communication network 400. Between the network devices A, B, C there are communication paths routed (illustrated by dashed lines, dash-dotted lines, and dotted lines). Each path comprises a number of physical links and intermediate packet network devices. However, in order to facilitate the understanding of the concept, these physical links and intermediate packet network devices are not illustrated. Between the packet network devices A and C there are two routed paths 402, 404, which have different desired traffic volumes. The first path 402 has a desired traffic volume of $f_2*\frac{3}{5}$, and the second path 404 has a desired traffic volume of $f_2*\frac{2}{5}$, where $f_2$ is the total desired traffic volume which will be distributed among the paths 402, 404, i.e. $f_2$ is the traffic demand for the packet network device A towards the packet network device C. When the packet network performs load balancing for the paths 402, 404 in this embodiment example, it establishes 2 virtual paths alongside the first path 402 and 1 virtual path alongside the second physical path. In total, there will then be 5 paths (2 physical and 3 virtual) to distribute the packet data among. By establishing the 3 virtual paths and distributing the packet data among the total 5 paths (virtual and physical ones), $\frac{3}{5}$ of the traffic demand will be routed on the path 402, and $\frac{2}{5}$ of the traffic demand will be routed on the path 404, which results in an efficient setup of how data will be forwarded on the routed paths 402, 404.

Moreover, even if the exemplifying embodiments are illustrated for two routed links or paths, the skilled person realises that PS communication system may be arranged alternatively within the concept. For instance, further links/paths may by taken into account when load balancing.

Furthermore, as stated above, even if the exemplifying embodiments are described for single demand cases, the skilled person realises how to amend the processes and packet network devices for multiple demand cases with further demands.

Reference throughout the specification to "one embodiment" or "an embodiment" is used to mean that a particular feature, structure or characteristic described in connection with an embodiment is included in at least one embodiment. Thus, the appearance of the expressions "in one embodiment" or "in an embodiment" in various places throughout the specification are not necessarily referring to the same embodiment. Further, the particular features, structures or characteristics may be combined in any suitable manner in one or several embodiments. Although the present invention has been described above with reference to specific embodiments, it is not intended to be limited to the specific form set forth herein. Rather, the invention is limited only by the accompanying claims and other embodiments than the specific above are equally possible within the scope of the appended claims. Moreover, it should be appreciated that the terms "comprise/comprises" or "include/includes", as used herein, do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

The concept is generally defined by the following independent claims. Exemplifying embodiments are defined by the dependent claims.

ABBREVIATIONS

ECMP Equal Cost Multipath
GRE Generic Routing Encapsulation
IP Internet Protocol
IS-IS Intermediate System to Intermediate System intra-domain routing information exchange protocol
LSP Label-switched Path
MPLS Multiprotocol Label Switching
OSPF Open Shortest Path First
TE Traffic Engineering
VLAN Virtual Local Area Network

The invention claimed is:

1. A method performed by a packet network device for enabling forwarding of packet data traffic among a plurality of physical links from the packet network device towards a destination packet network device, the method comprising:
   acquiring information about a desired traffic volume of each of the plurality of physical links;

calculating, based on the acquired information, a number of virtual links to be proportional to the desired traffic volumes of the physical links;

selecting the number of virtual links to be established;

establishing the number of virtual links alongside corresponding physical links of the plurality of physical links, wherein each virtual link has the same startpoint and endpoint as the physical link alongside which the virtual link is established, wherein for two or more combinations of establishment of allowable virtual links, a flow error U is calculated, and the virtual links are established according to the combination of allocation having the lowest flow error U, wherein the flow error U is calculated as $$U = \max_{i=1 \ldots k} \left\{ \frac{\hat{g}_i}{g_i} - 1 \right\},$$

where $g_i$ is a desired traffic volume of data to be forwarded on a physical link i and $\hat{g}_i$ is an actual traffic volume on the physical link i; and routing the packet data traffic among the physical links and the established virtual links, utilizing a shortest path routing protocol with load balancing.

2. A packet network device for enabling forwarding of packet data traffic among a plurality of physical links towards a destination packet network device, the packet network device comprising:

a communication unit;

a processor;

a memory storing computer program code, which, when run in the processor, causes the packet network device to:

acquire information about a desired traffic volume of each of the plurality of physical links;

calculate, based on the acquired information, a number of virtual links to be proportional to the desired traffic volumes of the physical links;

select the number of virtual links to be established;

establish the number of virtual links alongside corresponding physical links of the plurality of physical links, wherein each of the virtual links has the same startpoint and endpoint as the physical link alongside which the virtual link is established, wherein for two or more combinations of establishment of allowable virtual links, a flow error U is calculated, and the virtual links are established according to the combination of allocation having the lowest flow error U, wherein the flow error U is calculated as $$U = \max_{i=1 \ldots k} \left\{ \frac{\hat{g}_i}{g_i} - 1 \right\},$$

where $g_i$ is a desired traffic volume of data to be forwarded on a physical link i and $\hat{g}_i$ is an actual traffic volume on the physical link i; and route the packet data traffic among both the physical links and the established virtual links, utilizing a shortest path routing protocol with load balancing, and the communication unit is configured to forward the data traffic on physical links.

3. The packet network device of claim 2, wherein the computer program code, when run in the processor, further causes the packet network device to store the acquired information.

* * * * *